United States Patent Office 2,698,845
Patented Jan. 4, 1955

2,698,845

REACTION PRODUCTS OF LACTAMS AND CERTAIN AROMATIC POLYISOCYANATES

Thomas G. Mastin, Akron, and Nelson V. Seeger, Cuyahoga Falls, Ohio, assignors, by mesne assignments, to The Goodyear Tire & Rubber Company, a corporation of Ohio No Drawing. Application November 1, 1950,
Serial No. 193,514

7 Claims. (Cl. 260—239.3)

This invention relates to new compositions of matter and to a method for preparing the same. More particularly, it relates to the mono adducts of a lactam and a polyisocyanate and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055 and Serial No. 170,056 both now abandoned. According to the present invention, a means is provided for controlling the reactivity of polyisocyanates.

The broad object of this invention is to provide a new class of chemical compounds from polyisocyanates and lactams. It is a particular object to provide a new class of chemical compounds which are useful as delayed-action curing or cross-linking agents for diisocyanate-modified polyesters and polyester amides. It is another object of this invention to provide as new compositions of matter the mono-adducts of polyisocyanates and lactams. A specific object is to prepare the mono-adducts of polyisocyanates and lactams in which the reactivity of the polyfunctional character of the polyisocyanate may be controlled.

A convenient method for the preparation of the new compounds to which this invention relates may be represented by the following equation:

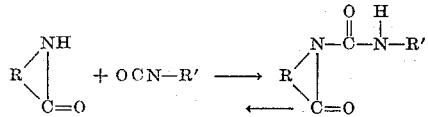

in which

is a lactam and R' is an organic radical which contains at least one —NCO group. It will be noted that the reaction between the polyisocyanate and the lactams is a reversible reaction, the direction of which may be controlled by temperature. The mono-adduct of the polyisocyanate and lactam is formed at relatively low temperatures while the formed mono-adduct dissociates into the polyisocyanate and lactam at relatively high temperatures in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanato triphenyl methane, 1,3,5-triisocyanato benzene, and 2,4,6-triisocyanato toluene; and the tetraisocyanates such as 4,4'-dimethyl-diphenyl methane 2,2',5,5'-tetraisocyanate.

Any lactam may be used in the preparation of the mono-adducts. Representative examples are epsilon-caprolactam, delta-valerolactam, gamma-butyrolactam, and beta propiolactam.

Certain preferred mono-adducts are those resulting from the reaction of a lactam and any one of the following:

1. 4,4'-diphenyl diisocyanate
2. 2,4-tolylene diisocyanate
3. 1,5-naphthalene diisocyanate
4. Hexamethylene diisocyanate Specific mono-adducts which are preferred are those resulting from the reaction of:

1. Epsilon-caprolactam and 4,4'-diphenyl diisocyanate
2. Epsilon-caprolactam and 2,4-tolylene diisocyanate
3. Epsilon-caprolactam and 1,5-naphthalene diisocyanate
4. Epsilon-caprolactam and hexamethylene diisocyanate In the preparation of the mono-adducts in general, the polyisocyanate and the lactam are usually dissolved in a suitable inert solvent such as toluene, methyl ethyl ketone, or o-dichlorobenzene. The solutions are stirred together and permitted to stand. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided so that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of the mono-adducts is illustrated by the following example which is to be interpreted as representative rather than restrictive of the scope of this invention.

Example 4,4'-diphenyl diisocyanate (47.2 grams or 0.20 mol) and epsilon-caprolactam (11.3 grams or 0.10 mol) were dissolved in 400 cubic centimeters of toluene. Separation of the mono-adduct started within one minute after the materials were dissolved. The white, solid product was separated from the solution by filtering and found to contain 22.3 grams of the mono-adduct.

While certain representative embodiments and details have been shown for the purpose of illustrating the invention, it will be apparent to those skilled in this art that various changes and modifications may be made therein without departing from the spirit or scope of the invention.

We claim:

1. As new compositions of matter the N-carbamyl lactams resulting from the reaction of a lactam and an aromatic polyisocyanate and defined by the formula

in which

is a lactam radical and R' is an aromatic radical containing at least one isocyanate group and is selected from the group consisting of $C_6H_4$, $C_6H_3 \cdot CH_3$, $C_{10}H_6$, $C_6H_4 \cdot C_6H_4$ $(C_6H_3 \cdot CH_3) \cdot (C_6H_3 \cdot CH_3)$ $(C_6H_3 \cdot OCH_3) \cdot (C_6H_3 \cdot OCH_3)$ $C_6H_4 \cdot CH_2 \cdot C_6H_4$ 2. The compositions of matter defined by claim 1 in which R' is

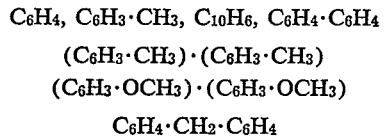

3. The compositions of matter defined by claim 1 in which R' is

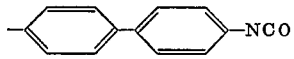

4. The compositions of matter defined by claim 1 in which R' is

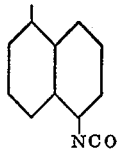

5. The compositions of matter defined by claim 2 in which R is $-(CH_2)_5-$.

6. The compositions of matter defined by claim 3 in which R is $-(CH_2)_5-$.

7. The compositions of matter defined by claim 4 in which R is $-(CH_2)_5-$.

References Cited in the file of this patent

UNITED STATES PATENTS

| | | |
|---|---|---|
| 2,457,832 | Jones | Apr. 19, 1949 |
| 2,480,814 | Punshon et al. | Aug. 30, 1949 |
| 2,516,836 | Dreschsel et al. | Aug. 1, 1950 |

FOREIGN PATENTS

| | | |
|---|---|---|
| 52,956 | Netherlands | July 17, 1942 |

OTHER REFERENCES

Wiley, J. Am. Chem. Soc., vol. 71, pp. 1310–11, 3746–48 (1949).